(12) United States Patent
Reinhart, Jr.

(10) Patent No.: US 11,304,243 B2
(45) Date of Patent: Apr. 12, 2022

(54) SYSTEM AND METHOD TO IDENTIFY USER EQUIPMENT DEVICE TYPE CONNECTED TO A WIRELESS NETWORK USING A SINGLE CHARACTERISTIC INDICATOR BASED ON CLASSMARK

(71) Applicant: Donald H. Reinhart, Jr., West Easton, PA (US)

(72) Inventor: Donald H. Reinhart, Jr., West Easton, PA (US)

( * ) Notice: Subject to any disclaimer, the term of this patent is extended or adjusted under 35 U.S.C. 154(b) by 0 days.

(21) Appl. No.: 16/914,870

(22) Filed: Jun. 29, 2020

(65) Prior Publication Data

US 2021/0410208 A1    Dec. 30, 2021

(51) Int. Cl.
*H04W 76/11* (2018.01)
*H04W 48/16* (2009.01)
*H04L 12/26* (2006.01)
*H04W 76/28* (2018.01)
*H04L 43/04* (2022.01)

(52) U.S. Cl.
CPC ............ *H04W 76/11* (2018.02); *H04L 43/04* (2013.01); *H04W 48/16* (2013.01); *H04W 76/28* (2018.02)

(58) Field of Classification Search
CPC ... H04W 76/114; H04W 48/18; H04W 76/11; H04W 48/16; H04W 76/28; H04L 43/04
See application file for complete search history.

(56) References Cited

U.S. PATENT DOCUMENTS

2017/0041873 A1\*    2/2017  Wu .................... H04W 4/70

\* cited by examiner

*Primary Examiner* — Diane D Mizrahi
(74) *Attorney, Agent, or Firm* — Law Office of Jerry Joseph, PLC; Jerry Joseph

(57) ABSTRACT

A method to identify user equipment devices connected to a wireless network, the method including, at a signaling node, including a non-transitory memory, and one or more processors coupled with the non-transitory memory, receiving a plurality of protocol signaling messages including Classmark from a user equipment device attempting to connect to a wireless network, connecting the user equipment device to the wireless network based on the plurality of protocol signaling messages from the user equipment device, using a single characteristic identification module, generating a single characteristic indicator for each type of user equipment device based on the Classmark; and using the processor coupled to the single characteristic identification module, determining a type of the user equipment device connected to the wireless network by only using the single characteristic indicator.

5 Claims, 5 Drawing Sheets

SYSTEM AND METHOD TO IDENTIFY USER EQUIPMENT DEVICE TYPE CONNECTED TO A WIRELESS NETWORK USING A SINGLE CHARACTERISTIC INDICATOR BASED ON CLASSMARK

BACKGROUND OF THE INVENTION

1. Field of the Invention

The present general inventive concept relates to a method and system for identifying user equipment's (UEs) device connecting to a mobile network through use of a single characteristic indicator based on Classmark.

2. Background of the Invention

Over the years, the number, and types of user equipment (UE) devices that are connected to wireless networks have increased substantially. This has created an increased burden on the networks in terms of quality and risk for fraudulent activity. As such, it is critical for telecommunication companies to identify the UE device type for each subscriber to control fraudulent abuse of the network and to provide optimized user experience.

Telecommunications companies utilize protocol signaling to administrate, control, and operate functions and operations between network nodes and UEs. There are several types of protocol signaling which include mechanisms for UEs to communicate and exchange information with a host of the network. Monitoring the protocol signaling between the UEs and the wireless networks provides information that is useful in determining faults in the network, characterizing the efficiency and quality of the network, as well as creating a data set of transactional records known as a "XDR."

Conventional solutions have been developed to identify types of UEs connected to the network based on unique International Mobile Equipment Identity (IMEI) numbers assigned to each UE device by the UE manufacturers.

However, in recent years, several companies have developed technology which allows users to change the UE's unique IMEI, at any time, to avoid fraud detection by the telecommunications companies. As a result, since fraudulent actors can now automatically and methodically change the IMEI of UEs to avoid fraud detection by telecommunications companies, using IMEI has become unreliable for conclusively identifying a subscriber's UE device type to prevent fraud.

Therefore, what is desired is a system and method for identifying a type of user equipment device connected to a wireless network using protocol signaling by using a single characteristic indicator, without relying on the UE's IMEI.

BRIEF SUMMARY OF THE INVENTION

An object of the invention is to provide a system and method to identify a type of user equipment device connected to a wireless network by only using a single characteristic indicator.

Another object of the invention is to provide a method of generating a single characteristic indicator for each type of user equipment device based on protocol signaling messages received from the user equipment device when attempting to connect (or already connected) to a wireless network.

The foregoing and/or other aspects of the present general inventive concept may be achieved by providing a method to identify user equipment devices connected to a wireless network, the method includes at a network node including a non-transitory memory, and one or more processors coupled with the non-transitory memory, receiving a plurality of protocol signaling messages including Classmark from a user equipment device attempting to connect (or already connected) to a wireless network, connecting the user equipment device to the wireless network based on the plurality of protocol signaling messages from the user equipment device, generating a single characteristic indicator for each type of user equipment device based on the Classmark, and determining a type of the user equipment device connected to the wireless network using the generated characteristic indicator. However, the present general inventive concept is not limited thereto. The present general inventive concept may be also achieved by providing a method to identify user equipment devices attempting to connect or already connected to a wireless network.

The foregoing and/or other aspects of the present general inventive concept may also be achieved by providing a method to identify user equipment devices connected to a wireless network, the method includes, at a signaling node, including a non-transitory memory, and one or more processors coupled with the non-transitory memory, receiving a plurality of protocol signaling messages including Classmark from a user equipment device attempting to connect to a wireless network, connecting the user equipment device to the wireless network based on the plurality of protocol signaling messages from the user equipment device, using a single characteristic identification module, generating a single characteristic indicator for each type of user equipment device based on the Classmark, and using the processor coupled to the single characteristic identification module, determining a type of the user equipment device connected to the wireless network using the single characteristic indicator.

The analyzing data within the received protocol signaling messages may include generating a characteristic identifier for each type of user equipment device and comparing the data within the received protocol signaling messages with the generated characteristic identifiers.

The characteristic identifier for each type of equipment device may include Classmark data, including Type 1, Type 2, and Type 3. However, the present general inventive concept is not limited thereto.

The foregoing and/or other aspects of the present general inventive concept may also be achieved by providing a User Equipment Device Identification System to identify user equipment devices connected to a wireless network, the system includes one or more processors, a plurality of modules in communication with the one or more processors, the plurality of modules including a signaling node module, a decoding module, a data processing module, a device type identification module, a single characteristic identification module, and a data storage module.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device.

It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

DETAILED DESCRIPTION OF INVENTION

Figure 1:
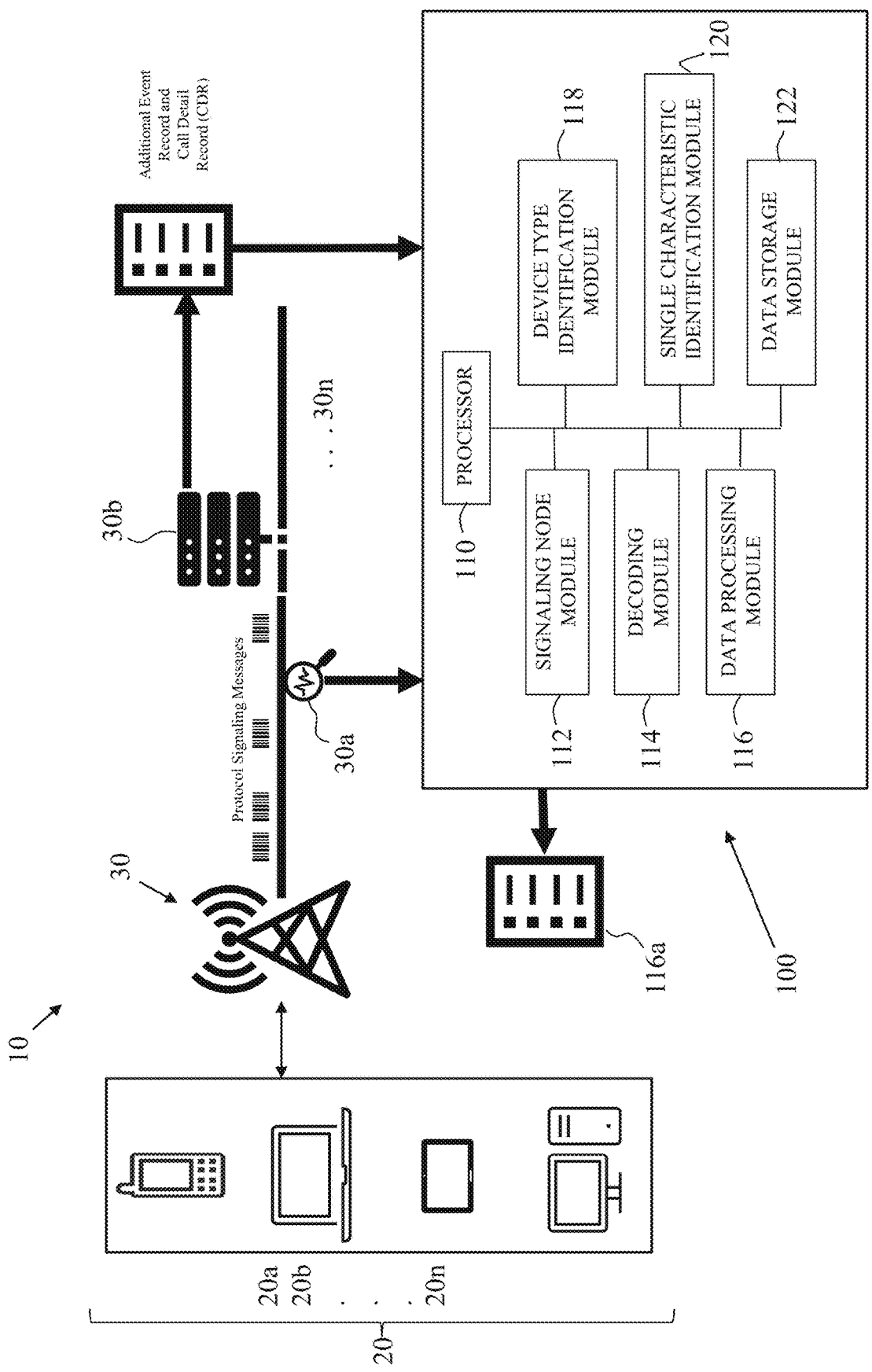
FIG. 1 is a schematic diagram of a User Equipment Device Identification (UEDI) System within a network environment according to an example embodiment of the present general inventive concept.

Reference will now be made in detail to the example embodiments of the present general inventive concept, examples of which are illustrated in the accompanying drawings, wherein like reference numerals refer to the like elements throughout. The exemplary embodiments are described below to explain the present general inventive concept by referring to the figures.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Various embodiments of the present general inventive concept provide a system and method to identify a type of user electronic device connected to (or attempting to connect to) a wireless network using a single characteristic indicator. For instance, in example embodiments, the present general inventive concept provides a method of generating a single characteristic indicator for each type of user equipment device based on protocol signaling messages separated into data fields, including Classmark received from the user equipment device when attempting to connect to a wireless network.

In alternative embodiments, the present general inventive concept provides a system of generating a single characteristic indicator for each type of user equipment device based on protocol signaling messages separated into data fields, including Classmark received from the user equipment device when attempting to connect to a wireless network.

FIG. 1 is a schematic diagram of a User Equipment Device Identification (UEDI) System within a network environment according to an example embodiment of the present general inventive concept.

Referring to FIG. 1, in an example embodiment of the present general inventive concept, the UEDI System 100 is connected within a conventional network environment 10 which includes user devices 20 comprising of a plurality of device types 20a, 20b . . . 20n and a cellular network 30 comprising of a plurality of network nodes 30a, 30b . . . 30n.

The UEDI System 100 according to the present embodiment is designed and/or configured to identify the device type 20a, 20b . . . 20n of each user device 20 connected to the mobile or cellular network 30, without using an International Mobile Equipment Identity (IMEI) of the user device 20.

In the present embodiment, the UEDI System 100 includes one or more processors 110 coupled to a signaling node module 112, a decoding module 114, a data processing module 116, a device type identification module 118, a single characteristic identification module 120, and a data storage module 122.

Wireless mobile telecommunications networks use protocol signaling to administrate, control, and operate functions and operations between nodes within the network and between user equipment's (UEs) and the network. There are different types of protocols used in various segments of a mobile telecommunications network. Several protocols are used as a mechanism for UEs to communicate and exchange information with their host network. In this way, protocols facilitate the exchange of information between the UEs and network to support the delivery of services like voice, short message service (SMS), and data on the networks.

In the present embodiment, the signaling node module 112 is designed and configured to capture protocol signaling messages directly from the cellular network 30. The decoding module 114 is designed and configured to decode the captured protocol signaling messages into data fields, including Classmark.

Monitoring of the protocol signaling messages within the mobile network 30 provides extensive information useful for determining faults in the network 30, characterizing the efficiency and quality of the network 30, as well as creating a data set of transactional records known as a "XDR" for use in various business analysis systems. These analysis systems perform functions like fraud control, verification of service billing, and services usage patterns by the mobile network subscribers.

In the present embodiment, the data processing module 116 is designed and configured to output an XDR data file 116a comprising event-based records which include the Classmark data field.

For applications in fraud control and optimization of service usage, it is important for the telecommunications or network companies to know the type of UEs 20 connected to the network 30. For instance, identification of UE device type can help the telecommunications company control fraudulent abuse of the network and services, as well as improve subscriber value and usage experience.

GSM and UMTS protocol signaling definitions account for the need of telecommunications companies to know subscriber UE device types through use of the International Mobile Equipment Identity (IMEI). The IMEI is a fifteen-digit numerical code assigned by the UE's manufacturer to every UE device it sells. Type Approval Bodies accredited within the industry allocate unique IMEI code ranges to UE manufacturers. The UE manufacturers use the code ranges to uniquely assign specific IMEIs to each UE they manufacture. The unique IMEI is meant to be permanently assigned to the UE by the manufacturer without the ability to later change it. Thus, the telecommunications company can uniquely identify every UE connected to the mobile network by its IMEI.

The IMEI is communicated from the UE to the mobile network through protocol signaling messages. In this way, a subscriber's UE device type is known to the telecommunications network, when the UE is using the services of the network. Device Management Systems provisioned within the network store the subscribers' UE IMEIs to support authentication, Over the Air (OTA) configuration, and business intelligence.

In recent years, some manufacturers of UEs used in fraudulent activity on mobile networks have enabled arbitrary changing of the unique IMEI assigned to the UE both at the time it was manufactured, as well as at any time later. In this way, fraudulent actors can automatically and methodically change the IMEI of these UEs to avoid detection of fraud by the telecommunications companies. Therefore, the IMEI has become unreliable for conclusively identifying a subscriber's UE device type. As a result, telecommunications companies lack visibility to subscriber UE device types in many cases.

In the present embodiment, the device type identification module 118 is designed and configured to analyze the XDR data file 116a in response to the data processing module 116 outputting the XDR data file 116a. The device type identification module 118 is further designed and configured to parse the XDR data file 116a in order to determine/identify the device type 20a, 20b . . . 20n of each user device 20 connected to the mobile or cellular network 30, without using an IMEI of the user device 20.

In the present embodiment, the single characteristic identification module 120 is designed and configured to generate a single characteristic indicator for each device type 20a, 20b . . . 20n of each user device 20 connected to (or attempting to connect) the mobile or cellular network 30, without using an IMEI of the user device 20. The single characteristic indicator is based on the Classmark data field within the XDR data file 116a generated from the protocol signaling messages that are captured by the signaling node module 112 transmitted between each user device 20 connected (or attempting to connect) to the network 30.

Figure 2:
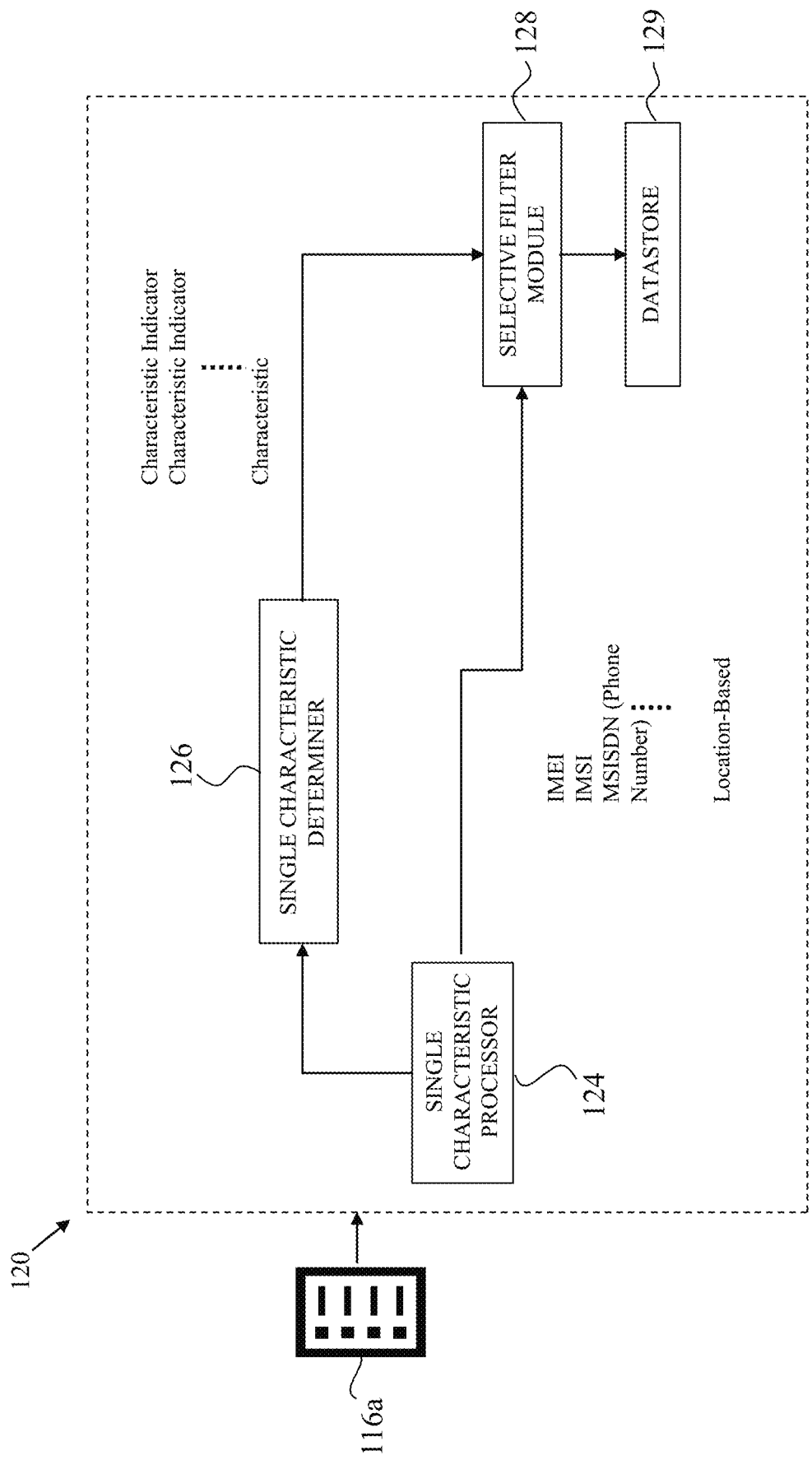
FIG. 2 is a block diagram of a Single Characteristic Identification Module according to an example embodiment of the present general inventive concept.

FIG. 2 is a block diagram of a Single Characteristic Identification Module 120 according to an example embodiment of the present general inventive concept.

In the present embodiment, the single characteristic identification module 120 may further include a single characteristic identification processor 124 coupled directly to a single characteristic analyzer/determiner 126, a selective filter module 128, and a datastore 129.

In the present embodiment, the data processing module 116 or other specialized modules may further be designed and configured to extract information from the XDR data file 116a to selectively filter the device types 20a, 20b . . . 20n into groups based on the single characteristic indicator generated by the single characteristic identification module 120. The selective filter module 128 may be designed and configured to extract information from the XDR data file 116a to selectively filter the device types 20a, 20b . . . 20n into groups based on the single characteristic indicator generated by the single characteristic identification module 120 and store this data within a data store 129. However, the present general inventive concept is not limited thereto.

In the present embodiment, the data storage module 122 may be designed and configured to store device types 20a, 20b . . . 20n with their associated single characteristic indicator generated by the single characteristic identification module 120 which is used to determine/identify the device type 20a, 20b . . . 20n of each user device 20.

The single characteristic identification processor 124 is configured to extract, decode, transform, and load the data fields from the protocol signaling messages based on the analyzed XDR data file 116a, including UE Classmark, and transmit the extracted and decoded data fields to the single characteristic determiner 126 and the selective filter module 128, simultaneously.

The single characteristic analyzer/determiner 126 utilizes the Classmark values extracted/decoded by the processor 124 from the transformed/extracted XDR data file 116a to only define a single characteristic corresponding to a specific User Equipment (UE) device type. The single characteristic analyzer/determiner 126 then stores the defined single characteristic unique to UE device type within the datastore 129.

The selective filter module 128 is configured to extract information from the XDR data file 116a in order to selectively filter the device types 20a, 20b . . . 20n into groups based on the single characteristic indicator generated by the single characteristic identification processor 124 within the single characteristic identification module 120.

As a result, the User Equipment Device Identification System 100 according to the present general inventive concept may be applied to improve fraud control technology by allowing telecommunication companies to accurately and efficiently identify UE device types based only on a single characteristic derived from Classmark information, without using unreliable UE IMEI information.

Further, the User Equipment Device Identification System 100 according to the present general inventive concept also improves the function of computer technology by improving the efficiency and reducing the amount of processor bandwidth and memory by detecting fraud by only using a single characteristic indicator to determine UE device type, without using UE IMEI information.

Figure 3:
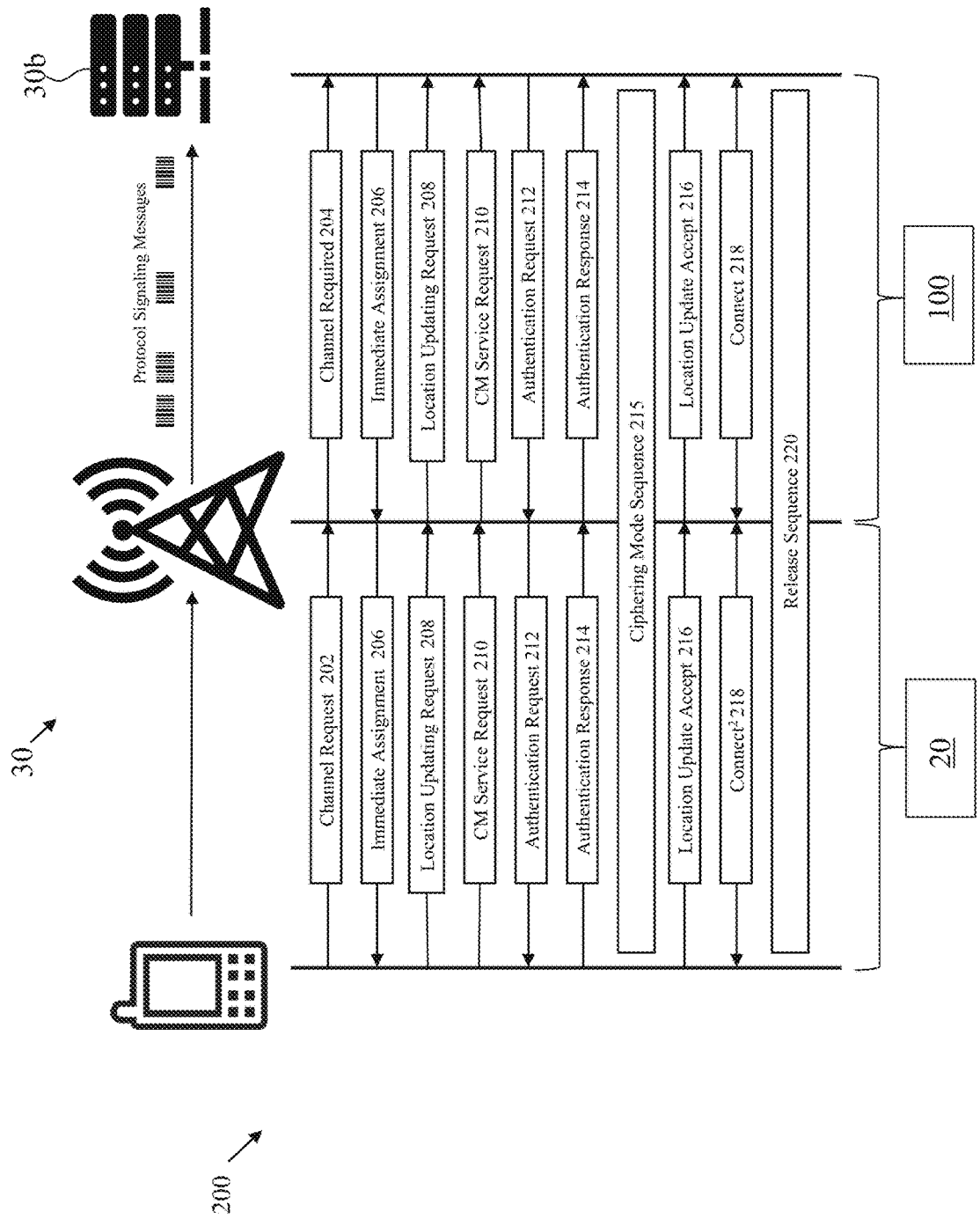
FIG. 3 is a sequence diagram illustrating protocol signaling messages exchanged between user equipment devices and a wireless network according to an embodiment of the present general inventive concept.

FIG. 3 is a sequence diagram illustrating protocol signaling messages exchanged between user equipment devices and a wireless network according to an embodiment of the present general inventive concept.

In the present embodiment, the User Equipment Device Identification System 100 utilizes the processor 110 coupled to the signaling node module 112 to receive, obtain, capture and decode the plurality of protocol signaling messages, including a Classmark transmitted between each user equipment device 20 and the network 30.

The sequence of protocol signaling messages shown in FIG. 3 is for illustrative purposes of the concept and based on Location Update procedures from industry standards. Actual message sequences may vary by specific procedures and networks and services used by the equipment device and network.

In FIG. 3, a Channel Request protocol message 202 is transmitted from the user device 20 to the network 30. Next, the Channel Request protocol message 202 is received by the network 30, decoded by the network 30, and transformed at the network 30 into a Channel Required protocol message 204 which is then transmitted to the network node 30b.

Next, the network node 30b generates and transmits an Immediate Assignment protocol message 206 to the user device 20 through the network 30.

Next, a Location Updating Request protocol message 208 is transmitted from the user device 20 to the network 30, decoded by the network 30, and then transmitted to the network node 30b. The Location Updating Request protocol message 208 may contain Classmark data field.

Next, a CM Service Request protocol message 210 is transmitted from the user device 20 to the network 30, decoded by the network 30, and then transmitted to the network node 30b. The CM Service Request message may contain the user equipment device Classmark data.

Next, an Authentication Request protocol message 212 is transmitted from the network node 20b to the user device 20 through the network 30. In response, the user device 20 generates and transmits an Authentication Response protocol message 214 to the network 30 which is then transmitted to the network node 30b.

Following the Authentication Response 214 message, a Ciphering Mode Sequence 215 of messages occurs between the user device 20 and the network 30.

Following the Cipher Mode Sequence 215, the user device 20 transmits a Location Update Accept protocol message 216 to the network 30 which is then transmitted to the network node 30b. In response, the network node 30b generates and transmits a Connect signal 218 to the user device 20 through the network 30.

Finally, a Release Sequence 220 of messages are exchanged between the user device 20 and network 30 to complete the Location Update procedure.

Figure 4:
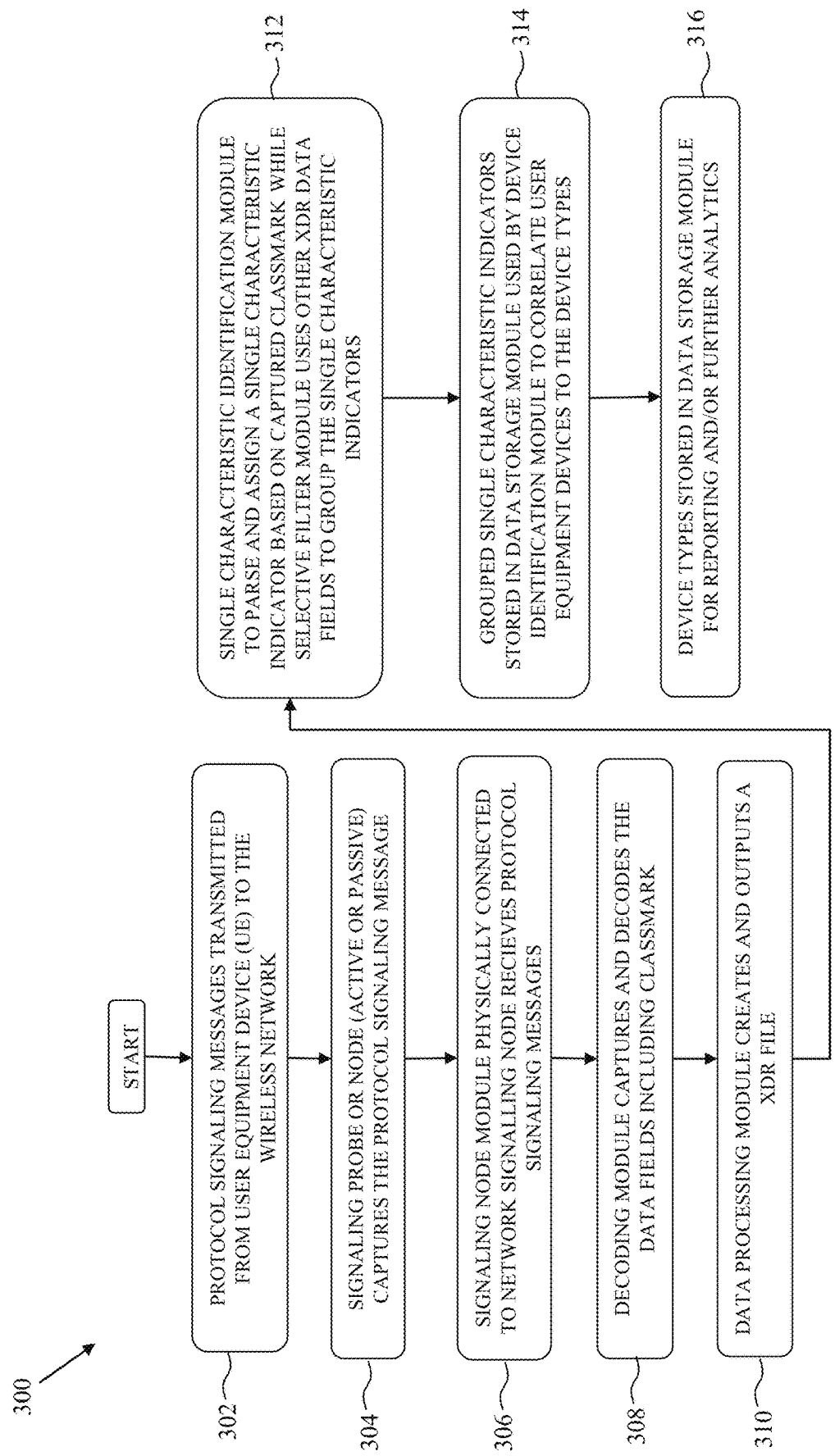
FIG. 4 is a flowchart illustrating a method of identifying user equipment device types connected to a wireless network, using a single characteristic indicator based on Classmark.

FIG. 4 is a flowchart illustrating a method 300 of identifying user equipment device types connected to a wireless network, using a User Equipment Device Identification System 100 to generate a single characteristic indicator based on Classmark.

Referring to FIG. 4, in an example embodiment, a method 300 of using a User Equipment Device Identification System 100 to generate a single characteristic indicator based on Classmark. Steps 308, 310, 312, 314, and 316 are implemented as a set of computer readable instructions that are executed within the User Equipment Device Identification Systems modules (e.g., the decoding module 114, the data processing module 116, the device type identification module 118, and the single characteristic identification module 120 shown in FIG. 1).

In the present embodiment, the method 300 begins at step 302 when protocol signaling messages are transmitted from the user device(s) 20 to the network 30.

Next, at step 304, an active or passive network signaling node 30a captures the plurality of protocol signaling messages.

Next at step 306, the signaling node module 112 that is physically connected to the network signaling node 30a receives the protocol signaling messages.

Next at step 308, the decoding module 114 captures and decodes the data fields, including Classmark.

Next at step 310, the data processing module 116 creates and outputs a XDR file 116a. (e.g., the XDR data file 116a shown in FIG. 1) which is sent to the single characteristics module 120.

Next, at step 312, the method 300 includes using a single characteristic identification module 120 to parse/and assign a single characteristics indicator based on Classmark while the Selective Filter module uses the other XDR 116a data fields to group the single characteristic indicators.

Next, at step 314, the grouped single characteristic indicators are stored in the data storage module 122 and used by the Device Identification Module 118 to correlate the devices 20 to the device types.

Finally, at step 316, the device types are stored in the data storage module 122 for reporting and further analytics purposes.

Figure 5:
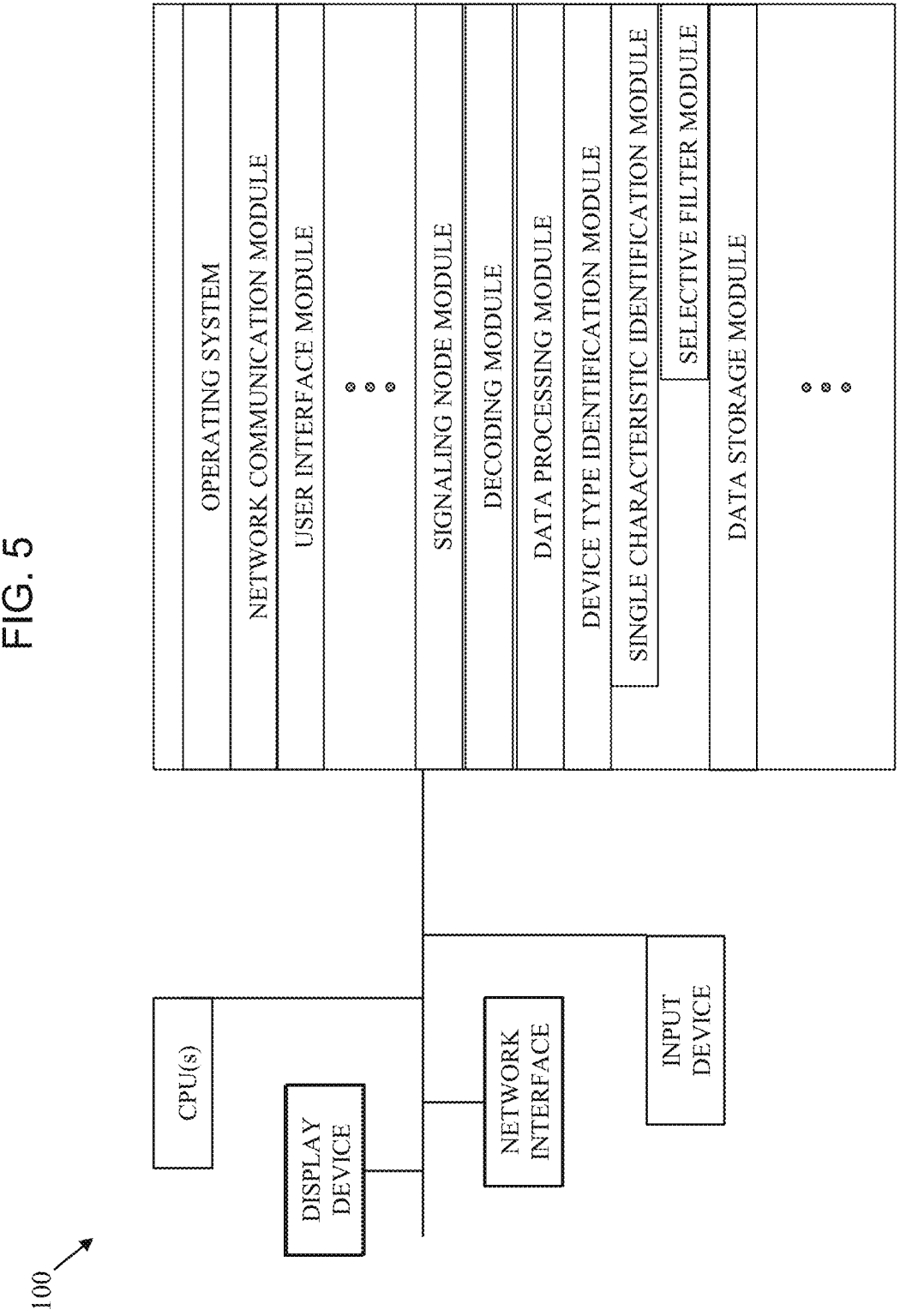
FIG. 5 is a block diagram of a User Equipment Device Identification System including a plurality of modules designed to identify user equipment device type connected to a wireless network using a single characteristic indicator based on Classmark.

FIG. 5 is a block diagram of a User Equipment Device Identification System 100 including a plurality of modules designed to identify user equipment device type connected to a wireless network using a single characteristic indicator based on Classmark.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

What is claimed is:

1. A method to identify user equipment devices connected to a wireless network, the method comprising the steps of:
   including, at a signaling node, a non-transitory memory, and one or more processors coupled with the non-transitory memory;
   receiving a plurality of protocol signaling messages including Classmark from a user equipment device attempting to connect to a wireless network;
   connecting the user equipment device to the wireless network based on the plurality of protocol signaling messages from the user equipment device;
   using a single characteristic identification module, generating a single characteristic indicator for each type of user equipment device based on the Classmark; and
   using the processor coupled to the single characteristic identification module, determining a type of the user equipment device connected to the wireless network using the single characteristic indicator.

2. The method of claim 1, wherein data is analyzed within the received protocol signaling messages.

3. The method of claim 2, further comprising the steps of:
generating a characteristic identifier for each type of user equipment device; and
comparing the data within the received protocol signaling messages with the generated characteristic identifiers.

4. The method of claim 3, wherein the characteristic identifier for each type of equipment device includes Classmark data.

5. The method of claim 4, wherein the characteristic identifier includes a first user equipment device type identifier and a second user equipment device type identifier.

* * * * *